United States Patent
Sadowski

(10) Patent No.: US 11,119,549 B2
(45) Date of Patent: Sep. 14, 2021

(54) MACHINE INTELLIGENCE PERFORMANCE BOOST WITH ENERGY RESERVOIR

(71) Applicant: Advanced Micro Devices, Inc., Santa Clara, CA (US)

(72) Inventor: Greg Sadowski, Cambridge, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 207 days.

(21) Appl. No.: 16/174,807

(22) Filed: Oct. 30, 2018

(65) Prior Publication Data
US 2020/0133360 A1 Apr. 30, 2020

(51) Int. Cl.
*G06F 1/26* (2006.01)
*G06N 3/04* (2006.01)

(52) U.S. Cl.
CPC ............... *G06F 1/263* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 6,121,694 A | 9/2000 | Thereze | |
| 2014/0184143 A1* | 7/2014 | Coakley | G06F 1/1632 320/107 |
| 2014/0281618 A1* | 9/2014 | Sultenfuss | G06F 1/30 713/323 |
| 2015/0198989 A1* | 7/2015 | Hayter | G06F 1/266 713/340 |
| 2017/0068293 A1* | 3/2017 | Nathadi | G06F 1/08 |
| 2018/0052431 A1* | 2/2018 | Shaikh | H02J 3/382 |
| 2018/0120915 A1* | 5/2018 | Li | G06F 1/3212 |
| 2019/0187771 A1* | 6/2019 | Ambardekar | G06N 3/04 |
| 2019/0354173 A1* | 11/2019 | Young | G06F 1/3231 |

\* cited by examiner

*Primary Examiner* — Jaweed A Abbaszadeh
*Assistant Examiner* — Cheri L Harrington
(74) *Attorney, Agent, or Firm* — Polansky & Associates, P.L.L.C.; Paul J. Polansky; Nathan H. Calvert

(57) ABSTRACT

Control of power supplied to a machine intelligence (MI) processor is provided with an energy reservoir and power switching circuitry coupled to a power supply, the energy reservoir, and to power delivery circuitry of the MI processor. Control circuitry directs the power switching circuitry to charge the energy reservoir from the power supply or discharge the energy reservoir to the MI processor based on MI state information obtained from the MI processor. Processes for charging and discharging such an energy reservoir are provided. Processes for analyzing state information of the MI processor and configuring the control circuitry are also provided.

14 Claims, 4 Drawing Sheets

MACHINE INTELLIGENCE PERFORMANCE BOOST WITH ENERGY RESERVOIR

BACKGROUND

Machine intelligence (MI) systems use specially programmed or configured processors to execute the algorithms or programs for machine learning. For example, central processing units (CPUs), graphics processing units (GPUs), and tensor processing units (TPUs), or specialized programmable hardware or specially-designed application specific integrated circuits (ASICs), may be used as MI processors. Such processors may be configured to accelerate performance of calculation-intensive algorithms such as neural networks.

Often the power supply to such systems supply has a limit on maximum power that can be delivered, which forces the system to throttle the operating speed of the MI processor in order to keep the power consumption below the system's allocated power limit. There are also frequent occurrences of situations in which the MI processor uses only a fraction of the available power, typically when the processor is not performing calculation intensive operations. These two frequently-occurring situations present inefficiencies to both the power usage and speed of processing for an MI processor. In this first situation, the total processing ability of the processor is not used efficiently. In the second, the total power supply ability of the system power supply is not used efficiently.

Figure 1:
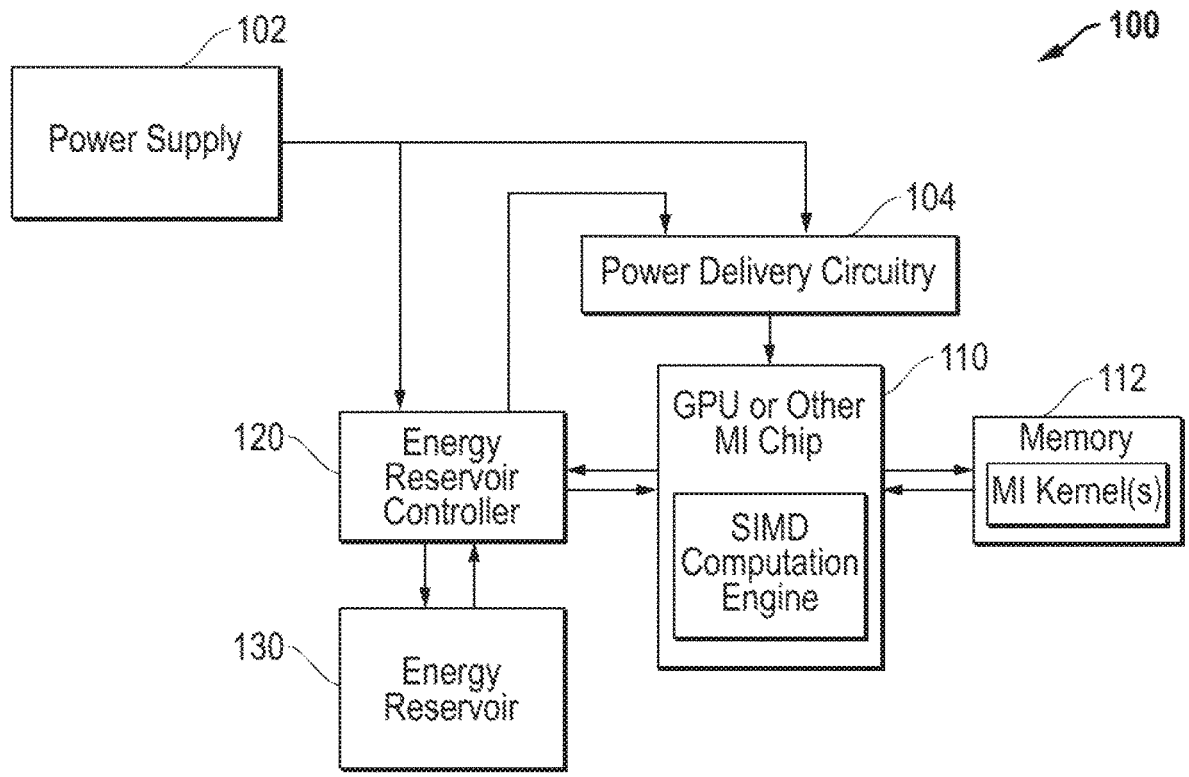
FIG. 1 shows in block diagram form a machine intelligence system and its power delivery system according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

As will be described below in one form, a circuit is provided, that is adapted to receive power from a power supply. The circuit includes a machine intelligence (MI) processor, an energy reservoir, power switching circuitry adapted to be coupled to the power supply, the energy reservoir, and to power delivery circuitry of the MI processor, and control circuitry operable to direct the power switching circuitry to charge the energy reservoir from the power supply or discharge the energy reservoir to the MI processor based on MI state information obtained from the MI processor.

As will also be described below, in another form, a method of power control includes receiving state information from an integrated circuit configured to perform machine intelligence (MI) operations. From the state information, the method determines a first condition exists in the integrated circuit, and in response directs power from a power supply to an energy reservoir. The method, also from the state information, determines that a second condition exists in the integrated circuit, and in response directs power from the energy reservoir to the integrated circuit.

As will further be described below, in still another form, a system is provided adapted to receive power from a power supply. The system includes a semiconductor device configured for operating a machine intelligence (MI) processor, and including power terminals adapted to be coupled to positive and negative terminals of the power supply. An energy reservoir is adapted to be coupled to the power supply positive and negative terminals and the power terminals of the semiconductor device. An energy reservoir controller coupled to the power supply, the energy reservoir, and to power delivery circuitry of the semiconductor device, the energy reservoir controller operable to direct power to charge the energy reservoir from the power supply or discharge the energy reservoir to the semiconductor device based on state information associated with the semiconductor device.

FIG. 1 illustrates in block diagram form a machine intelligence system 100 and its power delivery system. System 100 includes a machine intelligence (MI) processor 110 connected to receive power from power supply 102 through power delivery circuitry 104. MI processor 110 includes at least one semiconductor chip configured for operating a machine intelligence (MI) processor, and may be implemented as a monolithic semiconductor chip, a multi-chip module, or a group of interconnected chips or modules. MI processor 110 includes power terminals adapted to be coupled to positive and negative terminals of the power supply 102.

Power supply 102 may be any suitable power supply including a point-of-load power supply, a module-level, or a board-level power supply. Power delivery circuitry 104 may include power conditioning circuitry, a point-of-load supply or converter, smoothing capacitors, decoupling capacitors, or other suitable known power delivery circuitry. Power delivery circuit 104 may provide voltage boost or buck capability for the voltage delivered to MI processor 110. Power delivery circuitry 104 may be implemented board level circuitry, package level circuitry, or on-chip power conditioning circuitry.

An energy reservoir controller 120 is connected to the power supply positive and negative terminals, and connected to positive and negative terminals of an energy reservoir 130. Energy reservoir controller 120 is further connected to signaling terminals of MI processor 110, or to a suitable signaling bus, for sending and receiving data and instructions. Energy reservoir controller 120 is connected to power delivery circuitry 104 of MI processor 110 and is generally operable to direct power to charge energy reservoir 130 from power supply 102 or discharge energy reservoir 130 to deliver power to power delivery circuitry 104 for supplying MI processor 110 with additional power beyond that delivered by power supply 102. Such charging or discharging is controlled based on based on state information associated with MI processor 110 as further discussed below. Energy reservoir 130 may be implemented as capacitor, a group of capacitors, a battery, an inductor, or other suitable element for storing electrical energy. Energy reservoir 130 may be a separate element on the system's board or module, or may be integrated with energy reservoir controller 120.

MI processor 110 may include special purpose MI processing circuits, programmable hardware, or processors such as a graphics processing unit (GPU) programmed for MI applications. MI processor 110 in the depicted embodiment includes a massively parallel single instruction multiple data (SIMD) computation engine programmed to operate a neural network or other MI application. A memory 112 is connected to MI processor 110 and holds data for processing by MI processor 110. In this version, memory 112 holds MI kernels for loading and execution by MI processor 110's SIMD computation engine. In other embodiments, memory 112 may include other suitable executable code of for MI applications.

Figure 2:
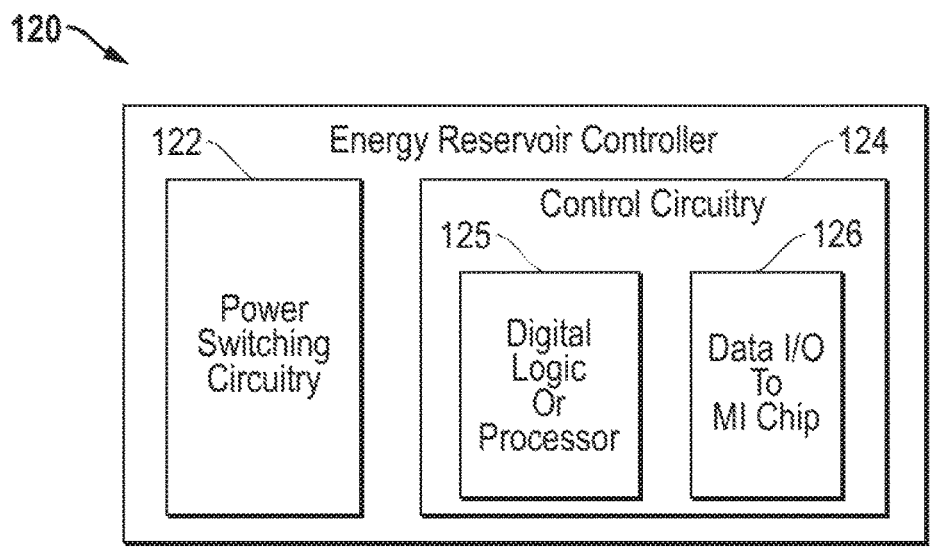
FIG. 2 illustrates in block diagram form an example energy reservoir controller according to some embodiments.

FIG. 2 illustrates in block diagram form an example energy reservoir controller 120. In this embodiment, energy reservoir controller 120 includes power switching circuitry 122 adapted to be coupled to the power supply 102, the energy reservoir 130, and to power delivery circuitry 104 of the MI processor 110. Power switching circuitry 122 includes suitable power transistors or switches. In some embodiments, power switching circuitry 122 may also include boost or buck power converter circuitry in order to maintain a desired output voltage during the discharge cycle. Energy reservoir controller 120 also includes control circuitry 124 operable to direct the power switching circuitry 122 to charge energy reservoir 130 from power supply 102, or to discharge energy reservoir 130 to supply MI processor 110 based on MI state information obtained from MI processor 110. Energy reservoir controller 120 may be implemented separately in a single mixed-signal semiconductor chip, or in multiple devices such as a digital controller chip and one or more analog power switching devices. Energy reservoir controller 120 may also be configured to supply power from energy reservoir 130 to other system devices, such as memory 112. Controller circuitry 124 is typically includes a small microprocessor, digital logic, or programmable logic configured to perform control functions as further described below. In other embodiments, control circuitry 124 may be part of a chip or module implementing MI processor 110. In operation, the state information is received through data I/O circuits 126, and passed to control circuitry 124 which execute the control functions.

Figure 3:
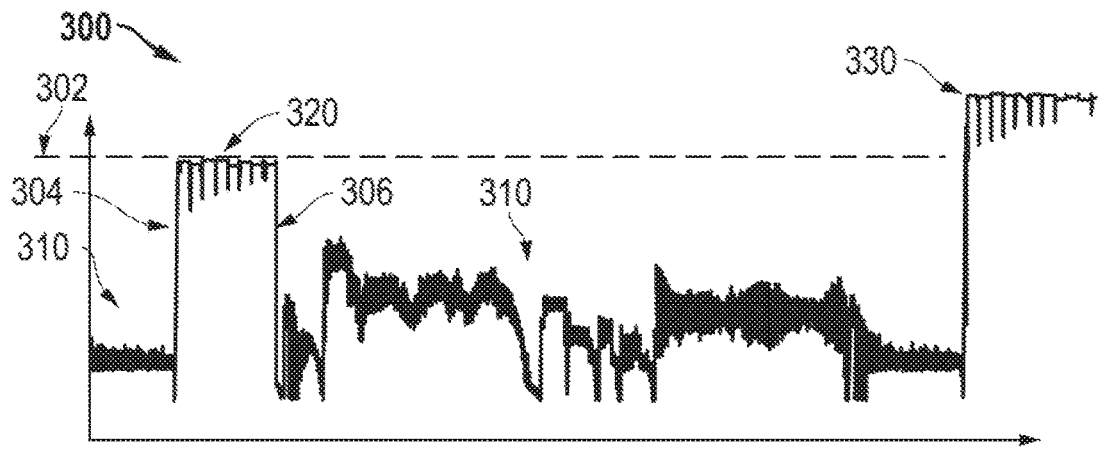
FIG. 3 illustrates a timing diagram of an example time series depicting power usage during operation according to some embodiments.

FIG. 3 illustrates in chart form an example time series 300 depicting power usage during operation according to some embodiments. Time series 300 depicts several power usage states that will be further discussed below, with the vertical axis showing power consumption of MI processor 110. A power limit 302 shows the power level normally allocated to MI processor 110 by power supply 102. Power limit 302 might be, on present day systems as an example, 250 watts, 300 watts, or 400 watts. This is merely an example and as MI processors increase in scale and complexity such limits will go up for certain applications. For other applications, such limits may be lower as more efficient processors are developed. Low power states 310 depict power usage of MI processor 110 in low power consumption states. Generally low power states and high power states refer to power consumption of the MI processor while operating, and not to defined power management states of a processor such as C-state (idle) and P-state, although an idle state may be employed in recognizing a low power state. Both the depicted low power states 310 and high power state 320 may occur with MI processor 110 in an operating state such as the traditional P-state. Transition 304 shows a transition from a low power state 310 to a high power state 320. High power state 320 as shown depicts the effects of throttling the performance of MI calculation circuitry within MI processor 110 in order to maintain power usage within the power limit 302. In this example, which shows power consumption of a GPU configured for MI processing according to the techniques herein, the time scale depicted is about 9 ms along the horizontal axis. Typically, the power states may range in length from micro-seconds to milliseconds. An extra power state 330 shows example power usage when energy reservoir 130 is being discharged to supplement the power supplied by power supply 102. The amount of additional power is typically set by designers as further described below, considering the thermal limits and processing needs, in order to increase speed of MI processor 110 when performing intense MI calculations.

Figure 4:
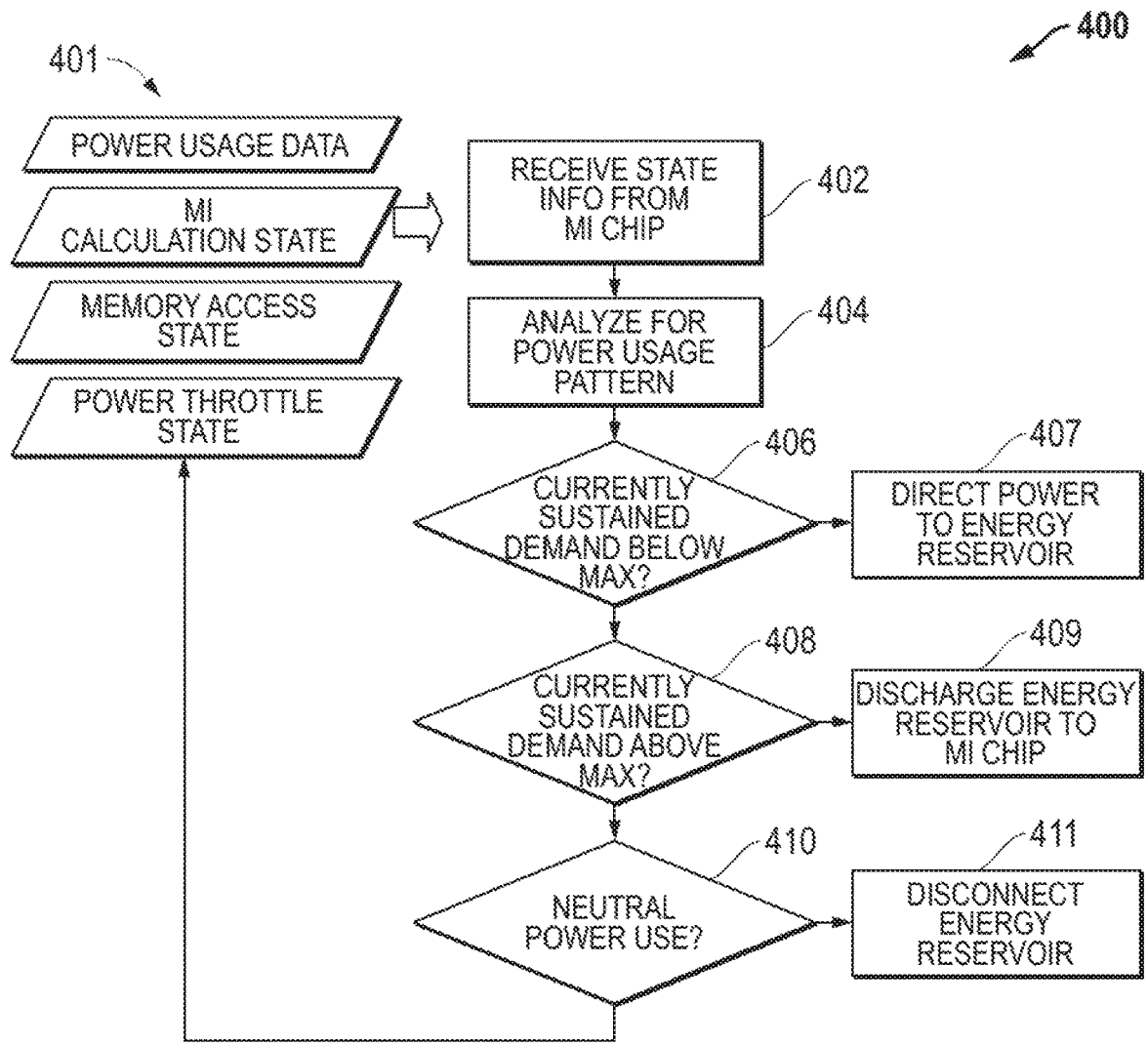
FIG. 4 illustrates in flow diagram form an example process of controlling power delivery to a MI processor according to some embodiments.

FIG. 4 illustrates in flow diagram form an example process 400 of controlling power delivery to a MI processor according to some embodiments. Process 400 is typically controlled by an embodiment of energy reservoir controller 120, however this relationship is not limiting, and other suitable circuitry may perform process 400. Generally, it is noted that while process 400 includes process blocks depicted in a certain order, process 400 may be implemented with the process blocks designed to execute asynchronously, such as with event driven programming or with programmable hardware blocks dedicated to selected functions. As such, the depicted order is not limiting.

As depicted at process block 402, process 400 receives state information 401 regarding the MI processor 110. State information 401 may include such information as power usage data of MI processor 110, the status or state of digital circuitry or operations in MI processor 110, or the memory access status of the MI processor 110, as further discussed with regard to FIG. 5 and FIG. 6. State information 401 may be received directly or indirectly from MI processor 110, or may be received from other circuitry associated with MI processor 110 or power supply 102, such as power usage monitoring circuitry, for example. State information 401 may also be produced by process 400 based on other information received or measurements taken regarding MI processor 110. At process block 404, process 400 may analyze state information 401 to recognize a power usage pattern of MI processor 110 based on the state information. An example process for such analysis is shown in FIG. 7.

Based on the received state information 401, process 400 at block 406 determines if the MI processor power usage is currently sustaining below its maximum power usage. Low power state 310 of FIG. 3 is an example of such a state. If a low power state is detected at block 406, process 400 directs power from power supply 102 to energy reservoir 130 as shown at process block 407. When implemented with the energy reservoir controller 120 of FIG. 2, for example, this block includes turning ON switches to direct the power supply voltage to energy reservoir 130. Preferably such a charging state lasts until the low power state changes or the reservoir is charged to capacity. Block 407 may include causing the voltage supplied by power delivery circuitry 104 to MI processor 110 to be reduced.

If process 400 determines that the MI processor is in a high power usage state, such as a state in which it is currently being throttled, and could benefit from power above the power supply maximum, or is already drawing such power, process 400 goes to block 409 where directs energy to discharge from energy reservoir 130 to MI processor 110. This discharge supplies a total power to MI processor 110 above the maximum power of power supply 102. Process block 409 may include sending instructions to power throttling circuitry of MI processor 110 to increase the upper threshold of power consumption allowed to provide a high power draw condition such as that depicted in extra power state 330 of FIG. 3. Block 409 may include causing power delivery circuitry 104 to boost the voltage supplied to MI processor 110. Again, the state reached at block 409 preferably lasts until the power demand state of MI processor 110 changes, or until energy reservoir 130 is discharged sufficiently that it cannot supply the additional power. While discharging energy reservoir 130 to supply power to MI processor 110 is shown, energy reservoir 130 may also be discharged to supply other parts of the system such as memory 112.

If process 400 determines that the MI processor power usage is currently in a neutral state at block 410, process 400 goes to block 411 where it disconnects the energy reservoir, neither charging nor discharging. Such a neutral state may be defined differently for different applications, but generally includes a steady power demand at MI processor 110 at or near the power supply maximum, and may include other conditions such as determining that energy reservoir 130 is fully charged or determining that MI processor 110 is in a designated state. The loop from block 410 back to state information 401 indicates that process 400 continues to monitor state information 401, typically with event driven logic such that detecting the designated conditions changes the charging state of energy reservoir 130.

Figure 5:
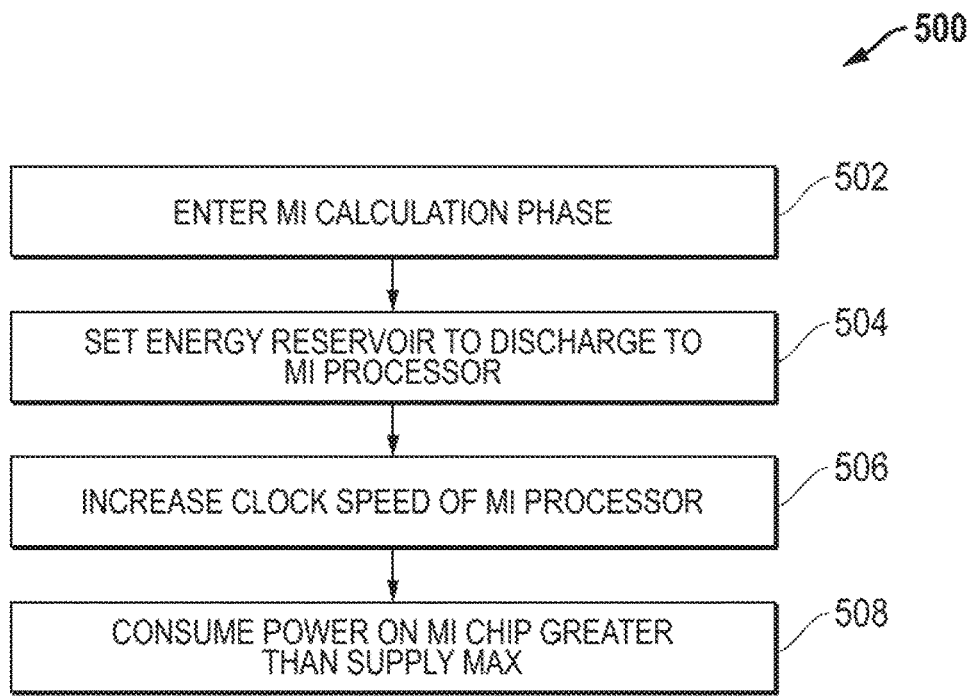
FIG. 5 shows in flow diagram form a process for discharging energy reservoir according to some embodiments.

FIG. 5 shows in flow diagram form a process 500 for discharging energy reservoir 130. Process 500 receives state information indicating that MI processor 110 is entering an MI calculation phase at block 502. For example, state information 401 may include an indicator that a kernel of MI processor 110 is invoked to operate a neural network, or otherwise that neural network simulation circuitry has entered a calculation phase as opposed to a data load phase. State information 401 may include an indicator of a number of processor kernels invoked to operate the neural network. State information 401 may include information indicating whether circuitry implementing neural network calculations is operating, or, more generally, information indicating that MI calculation circuitry of MI processor 110 is entering an active phase. State information 401 may include information that MI calculation circuitry is being throttled or otherwise limited o avoid using more than an allocated amount of power. As another example, state information 401 may include an indicator that the semiconductor device is loading data from memory 112 to inputs of a neural network.

In response to block 502, process block 504 discharges energy reservoir 130 to supply power to MI processor 110. In the embodiment of FIG. 1, block 504 is implemented by energy reservoir controller 120 configuring power switching circuitry 122. At process block 506, process 500 increases the clock speed of MI processor 110. In some embodiments, block 506 may be controlled by energy reservoir controller 120 signaling MI processor 110, or may be controlled by circuits or software within MI processor 110. Process block 506 may also include increasing the supply voltage level of MI processor 110. Such voltage increase may be provided by voltage buck circuitry in power switching circuitry 122, or voltage buck circuitry in power delivery circuitry 104. At process block 508, MI processor 110 consumes power greater than the maximum power normally provided to MI processor 110 by power supply 102. Such a maximum may represent the total maximum output of power supply 102, or may represent the maximum power allocated by power supply 102 for MI processor 110, for example in embodiments in which power supply 102 also supplies other circuitry. An example of the increased power consumption at block 508 is depicted in FIG. 3, at the extra power state 330, where the power consumption is increased by about 25% about the depicted power limit 302. This example is not limiting, any suitable additional above the supply maximum may be provided, such as 10%, 20%, 30%, 40%, or 50%, for example. The additional power is typically set by designers, considering the thermal limits and processing needs, in order to increase speed of MI processor 110 when performing intense MI calculations. As can be seen in the example of FIG. 3, the power consumption during extra power state 330 is also throttled, but at a higher level, which may be set at block 506 by adjusting the power throttling settings of the MI processor. Therefore, it should be noted that increased voltage and clock frequency are not necessarily required to achieve the higher power consumption at block 508. That is, generally when MI processor 110 consumes more power, is either running faster at higher frequency clocks, which typically requires higher voltage, or it is running at the same clock frequencies but more components of the circuits are involved (for example instead of 10 out of 32 compute units, an increase to 20 out of 32 compute units may be running, with the clock frequency unchanged). Therefore, while FIG. 5 and FIG. 6 include changing the clock speed of MI processor 110, other embodiments may not include changing the clock speed.

Figure 6:
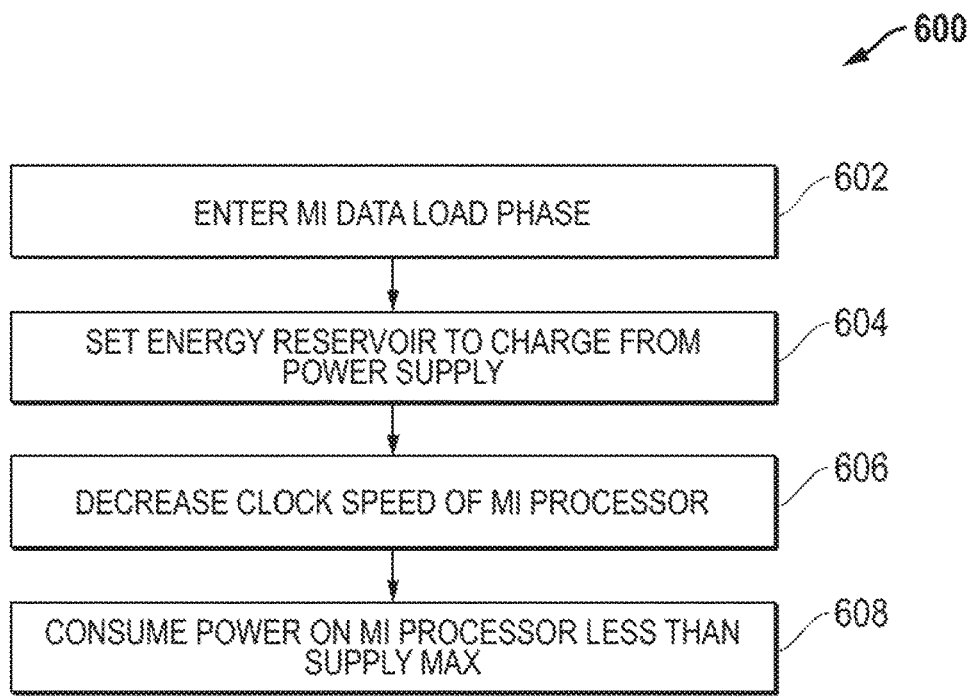
FIG. 6 shows in flow diagram form a process for charging an energy reservoir according to some embodiments.
Figure 7:
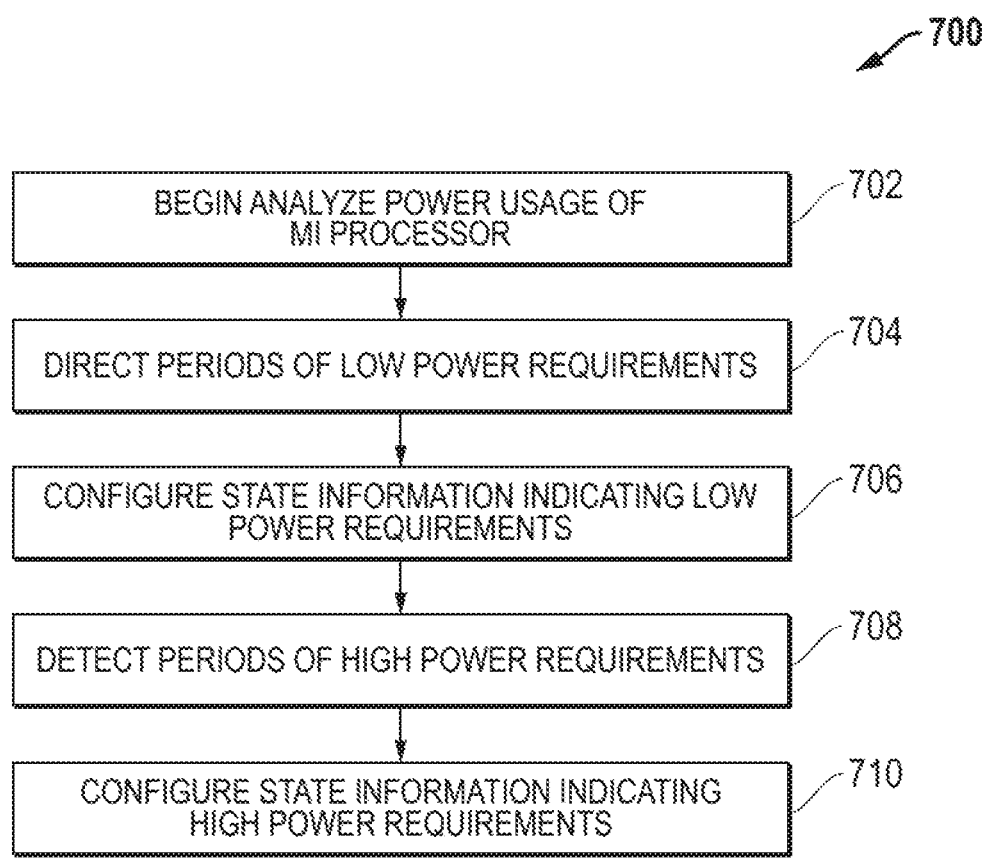
FIG. 7 shows in flow diagram form a process of analyzing power usage of a MI processor according to some embodiments.

FIG. 6 shows in flow diagram form a process 600 for charging energy reservoir 130. Process 600 receives state information indicating that MI processor 110 is entering an MI data load phase at block 602. This phase typically includes loading data from memory for analysis by MI processor 110. While a data load phase is shown, other operating conditions of MI processor 110 may trigger the energy reservoir 130 charging state. For example, a standby phase or other conditions that generally include power consumption lower than the maximum power provided by power supply 102 to MI processor 110 may also be recognized by process 600 at block 602. In response, process block 604 charges energy reservoir 130 from power supply 102. As with the discharging process of FIG. 4, block 604 may be implemented by configuring power switching circuitry 122. At process block 606, process 600 decreases the clock speed of MI processor 110. The supply voltage may also be altered at block 606, if so it is typically lowered from an increased supply voltage set at block 506. Then, at process block 608, process 600 includes operating the MI processor 110 with it consuming less power than the maximum power normally provided to MI processor 110 by power supply 102.

FIG. 7 shows in flow diagram form a process 700 of analyzing power usage of MI processor 110 according to some embodiments. The depicted process 700 may be employed to configure an energy reservoir controller 130 in some embodiments. As with the other flow diagrams herein, the depicted order is an example and is not limiting. Some of all of the depicted process blocks may be performed, for example, to implement process block 404 of FIG. 4. At process block 702, process 700 begins analyzing power usage of MI processor 110. At block 704, process 700 detects periods of low power requirements by MI processor 110. Block 704 may include gathering power consumption data over time, such as the example data depicted in FIG. 3, and gathering state information of MI processor 110 accompanying the power consumption data. As part of block 704, process 700 operates to recognize a power usage pattern of the MI processor based on the state information. Preferably block 704 detects periods of power requirements significantly below a capacity of the power supply allocated to MI processor 110. Preferably the periods analyzed are bounded by state changes of MI processor 110, such as, for example, the transition from accessing memory and loading data to analyzing the loaded data. This is not limiting, however, and the periods may be determined by other methods, for example based only on power usage data over time. A transition of power consumption or a short term average of power consumption, up or down through a determined threshold may form the boundaries of the periods, for example. Examples of such transitions are shown in FIG. 3, with transition 304 exemplifying an upward transition from a low power state to a high power state, and transition 306 exemplifying a transition from a high power state to a low power state. Such a threshold may be set by designers or determined by process 700, such as, for example, by recognizing periods with different sustained levels or ranges of power usage and setting the threshold between the levels or ranges. As such, what is meant by "significantly below the capacity" may vary based on application. In some versions, this may be 40% below or 50% below capacity, while in others it may mean 20% or 25% below, for example. In the example of FIG. 3, the low power state 310 has an upper bound about 30% below the depicted maximum capacity 305, and generally averages out to about 50% below capacity.

At process block 706, process 700 configures energy reservoir controller 120 with state information controller to identify a first condition indicating low power consumption. This block may store the state information 401 necessary to identify the low power state, power threshold levels, or other suitable configuration information. At process block 708, process 700 detects periods of high power requirements by MI processor 110. Such detection proceeds similarly to that of block 704, detecting periods of power usage at or near the capacity of the power supply 102. At block 710, process 700 configures energy reservoir controller 120 with state information to identify a second condition indicating high power consumption by MI processor 110.

The techniques herein may be used, in various embodiments, with any suitable products (e.g. machine learning, image analysis, neural networks, autonomous vehicles) that use dedicated MI processors. Further, the techniques are broadly applicable for use MI processors implemented with GPU and CPU architectures or ASIC architectures, as well as programmable logic architectures.

While particular embodiments have been described, various modifications to these embodiments will be apparent to those skilled in the art. For example, the front-end controllers and memory channel controllers may be integrated with the memory stacks in various forms of multi-chip modules or vertically constructed semiconductor circuitry. Different types of error detection and error correction coding may be employed.

Accordingly, it is intended by the appended claims to cover all modifications of the disclosed embodiments that fall within the scope of the disclosed embodiments.

What is claimed is:

1. A circuit adapted to receive power from a power supply, the circuit comprising:
   a machine intelligence (MI) processor;
   an energy reservoir;
   power switching circuitry adapted to be coupled to the power supply, the energy reservoir, and to power delivery circuitry of the MI processor; and
   control circuitry operable to direct the power switching circuitry to charge the energy reservoir from the power supply or discharge the energy reservoir to the MI processor based on MI state information obtained from the MI processor, wherein when the MI state information indicates a kernel implementing a neural network layer is active, the control circuitry causes the reservoir to discharge.

2. The power controller circuit of claim 1, wherein when the MI state information comprises information indicating that the MI processor is loading data from memory to inputs of a neural network, the control circuitry causes the reservoir to charge.

3. The power controller circuit of claim 1, in which the control circuitry is further operable to signal the MI processor to increase a clock rate of MI calculation circuitry.

4. The power controller circuit of claim 1, in which the MI processor is implemented as a monolithic semiconductor chip.

5. A method comprising:
   receiving state information from an integrated circuit configured to perform machine intelligence (MI) operations, the state information indicating at least one of whether: a kernel implementing a neural network layer is active, and the MI processor is loading data from memory to inputs of a neural network;
   when the MI state information indicates a kernel implementing a neural network layer is active, the control circuitry causes the reservoir to discharge;
   when the MI state information comprises information indicating that the MI processor is loading data from memory to inputs of a neural network, the control circuitry causes the reservoir to charge.

6. The method of claim 5, which the state information includes an indicator of a number of processor kernels invoked to operate the neural network.

7. The method of claim 5, in which the integrated circuit includes a massively parallel single instruction multiple data (SIMD) computation engine programmed to operate a neural network.

8. The method of claim 5, further comprising:
   detecting periods of power requirements significantly below a capacity of the power supply;
   in response, configuring state information for an energy reservoir controller to identify that the MI processor is loading data from memory to inputs of a neural network;
   detecting periods of power usage at or near the capacity of the power supply; and
   in response, configuring state information for the energy reservoir controller to identify that a kernel implementing a neural network layer is active.

9. The method of claim 5, further comprising directing power from the energy reservoir to an additional integrated circuit.

10. A system adapted to receive power from a power supply, the system comprising:
    a semiconductor device configured for operating a machine intelligence (MI) processor, and including power terminals adapted to be coupled to positive and negative terminals of the power supply;

an energy reservoir is adapted to be coupled to the power supply positive and negative terminals and the power terminals of the semiconductor device; and an energy reservoir controller is adapted to be coupled to the power supply, the energy reservoir, and to power delivery circuitry of the semiconductor device, the energy reservoir controller operable to direct power to charge the energy reservoir from the power supply or discharge the energy reservoir to the semiconductor device based on state information associated with the semiconductor device, wherein when the MI state information comprises information indicating that the MI processor is loading data from memory to inputs of a neural network, the control circuitry causes the reservoir to charge.

11. The system of claim 10, wherein when the MI state information indicates a kernel implementing a neural network layer is active, the control circuitry causes the reservoir to discharge.

12. The system of claim 10, in which the semiconductor device is adapted to use more power than a maximum power of the power supply when the energy reservoir is discharged to the semiconductor device.

13. The system of claim 10, in which the energy reservoir controller is further operable to recognize a power usage pattern of the semiconductor device based on the state information.

14. The system of claim 10, in which the semiconductor device includes a massively parallel single instruction multiple data (SIMD) computation engine programmed to operate a neural network.

* * * * *